United States Patent [19]

Kerr et al.

[11] Patent Number: 4,916,536
[45] Date of Patent: Apr. 10, 1990

[54] WIDE ANGLE, VIDEO RATE IMAGING RANGE FINDER

[75] Inventors: James R. Kerr, Tigard; Michael E. Fossey, Beaverton, both of Oreg.; David M. Aikens, Pleasanton, Calif.; Bruce L. Cannon, Lake Oswego; John J. McDonald, West Linn, both of Oreg.

[73] Assignee: FLIR Systems, Inc., Portland, Oreg.

[21] Appl. No.: 268,337

[22] Filed: Nov. 7, 1988

[51] Int. Cl.⁴ .............................................. H04N 7/18
[52] U.S. Cl. ...................................... 358/107; 358/87; 358/113
[58] Field of Search ................. 358/107, 87, 113, 222, 358/93, 206, 209; 356/4, 5, 8, 16

[56] References Cited

U.S. PATENT DOCUMENTS

| | | |
|---|---|---|
| 3,611,182 | 10/1971 | Treacy . |
| 3,636,250 | 1/1972 | Haeff . |
| 3,652,784 | 3/1972 | Wupper et al. .................. 358/113 X |
| 3,754,249 | 8/1973 | Kearney, II . |
| 3,909,131 | 9/1975 | Waters . |
| 4,035,081 | 7/1977 | Sepp et al. . |
| 4,158,151 | 6/1979 | Grundler . |
| 4,298,280 | 11/1981 | Harney .................. 358/113 X |
| 4,309,618 | 1/1982 | Carter, Jr. et al. . |
| 4,349,843 | 9/1982 | Laakman et al. . |
| 4,357,649 | 11/1982 | LaCroix . |
| 4,397,025 | 8/1983 | Kebabian . |
| 4,443,705 | 4/1984 | DiMatteo et al. . |
| 4,443,706 | 4/1984 | DiMatteo et al. . |
| 4,476,494 | 10/1984 | Tugayé .................. 358/22 |
| 4,495,500 | 1/1985 | Vickers . |
| 4,528,669 | 7/1985 | Bostick et al. . |
| 4,546,458 | 10/1985 | Cielo et al. . |
| 4,591,987 | 5/1986 | Brown . |
| 4,593,368 | 6/1986 | Fridge et al. . |
| 4,602,336 | 6/1986 | Brown . |
| 4,635,203 | 1/1987 | Merchant . |
| 4,672,562 | 6/1987 | Egli et al. . |
| 4,672,564 | 6/1987 | Egli et al. . |
| 4,705,401 | 11/1987 | Addleman et al. . |
| 4,709,369 | 11/1987 | Howard . |
| 4,736,247 | 5/1988 | Graham et al. . |
| 4,736,380 | 5/1988 | Agoston . |
| 4,751,658 | 6/1988 | Kadonoff . |

*Primary Examiner*—James J. Groody
*Assistant Examiner*—Victor R. Kostak
*Attorney, Agent, or Firm*—Kolisch, Hartwell & Dickinson

[57] ABSTRACT

The imaging range finder of the invention includes a radiation transmitter, a transmitting section and a receiving section. The transmitting section directs radiation across an angular field of view by a first rotating mirror having a plurality of facets. The receiving section includes a second rotating mirror also with a plurality of facets which collects any reflected radiation. An image is produced by measuring the intensity of the reflected radiation at numerous points in the field of view. Range is determined by radiation modulation. Range may be determined more precisely at shorter ranges by modulating the radiation to produce two subcarriers and using one subcarrier to supply short range information. The finder is stabilized to preserve imaging and range finding accuracy when it is exposed to vibration or pitch-angle disturbance. The invention also discloses a method of imaging and range finding over very wide angles and at standard picture frame frequencies.

14 Claims, 6 Drawing Sheets

IMAGING RANGE FINDER AND METHOD

BACKGROUND OF THE INVENTION

1. Field of the Invention

This invention relates to imaging and range finding devices and methods. More particularly, this invention relates to devices and methods for imaging and range finding over very wide angular fields of view and at standard picture frame frequency.

2. Description of the Prior Art

Imaging devices are systems which depict predetermined fields of view and include such things as video cameras and television monitors. Range finding devices determine the distance between an object and the device and include such items as radar. Accordingly, an imaging range finder both images and range finds an object.

One example of an imaging device is Laakmann, U.S. Pat. No. 4,349,843, which discloses a television compatible thermal imaging system. That device scans thermal radiation emitted from objects, processes the radiation and displays a television picture of the scene. It is also capable of showing the scene at the standard picture frame frequency of 30-hertz set forth by the National Television System Committee ("NTSC"). However, it cannot scan an angular field of view greater than 51-degrees in the horizontal direction. Additionally, that device does not range find.

Range finding devices often require an object to be viewed from two different locations. For example, Merchant, U.S. Pat. No. 4,635,203, discloses a method for measuring range in which one view of an object is made to coincide with a second view taken of the same object from a different location. By calculating the transformation coefficients which will make the two images coincide, range may be determined.

Similarly, in Brown, U.S. Pat. No. 4,591,987, a video range finder is described which displays a split image of an object on a video monitor. By computing the tangent of the angle between the split images when the images are properly positioned, and if the true vertical dimension of the object is known, the range to the object may be calculated. That procedure does not require the object to be viewed from two different locations.

Present-day systems are not capable of simultaneously imaging and range finding at the NTSC standard television picture frame frequency of 30-hertz or at the International Radio Consultavie Committee ("CCIR") standard frequency of approximately 25-hertz. In other words, present-day systems cannot televise a scene and update frames of that scene at such standard frequencies while simultaneously determining the distance to the objects in the scene.

Additionally, present-day imaging and range finding devices cannot scan a wide angular field of view. Imaging devices such as video cameras generally have a horizontal angular field of view of less than 45-degrees. For wide angle optics, lenses such as fisheye lenses are normally required.

This invention overcomes the limitations of the prior art because it is capable of imaging and range finding over a very wide angular field of view at standard picture frame frequencies.

SUMMARY OF THE INVENTION

The imaging range finder of the invention includes a radiation transmitter, a transmitting section and a receiving section. The transmitting section directs radiation across an angular field of view by a first rotating mirror having a plurality of facets. The receiving section includes a second rotating mirror also with a plurality of facets which collects any reflected radiation.

An image is produced by measuring the intensity of the reflected radiation at numerous points in the field of view. From these measurements, a video depiction of the scene is produced. Each measured point in the field of view corresponds to a picture element or pixel in the final video display of the scene.

Range is determined by radiation modulation. The radiation is modulated before it is directed across the field of view. Certain wave characteristics of the reflected radiation will differ from those characteristics of the originally modulated radiation. Analyzing the differences at numerous points in the field of view supplies the information necessary to compute the range to each point analyzed. Each point corresponds to a pixel of the final video display. Thus, range is determined on a pixel-by-pixel basis and at the same frequency as the image is displayed.

The imaging range finder of the invention may also determine range more precisely at shorter ranges. This is accomplished by modulating the radiation to produce two subcarriers. Short-range information is derived from one subcarrier and long-range information is derived from the other subcarrier.

Another feature is the stabilization of the device when it is exposed to vibration and pitch-angle disturbance. Stabilization preserves the device's imaging and range finding accuracy and includes both mechanical and electrical aspects.

The invention also discloses a method of imaging and range finding over very wide angles and at standard picture frame frequencies.

DETAILED DESCRIPTION OF THE PREFERRED EMBODIMENT

Figure 1:
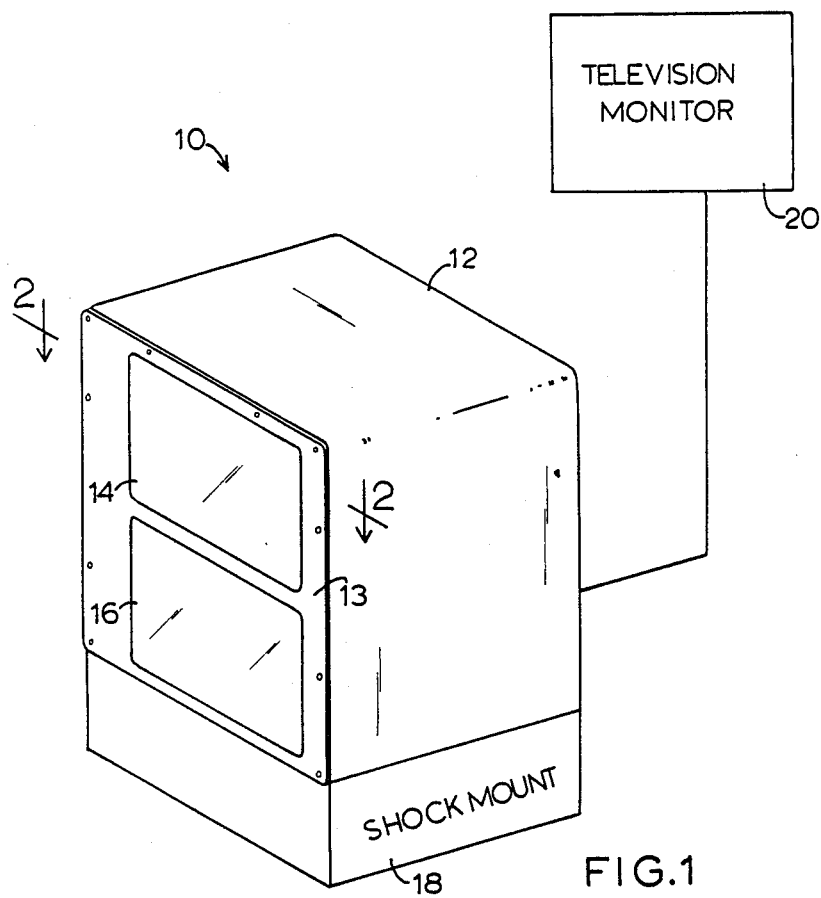
FIG. 1 shows a external view of an imaging range finder constructed according to the invention.

FIG. 1 shows generally at 10 an external view of an imaging range finder (referred to also as "finder") constructed according to the invention. Finder 10 includes a casing 12, which has a front plate 13 allowing access to its interior, a first window 14 and a second window 16.

Window 14 is an aperture out of which radiation may be directed and scanned across a predetermined angular field of view. Window 16 is an aperture through which reflected radiation may be collected. Both windows are transparent to the radiation which is scanned across the field of view. Thus, neither window optically affects the scanning radiation.

Finder 10 may be mounted to an object which vibrates or pitches. Such vibration or pitch may misdirect the scanning radiation resulting in flawed performance. Accordingly, a standard shock mount 18 is included in the preferred embodiment. Shock mount 18 dampens vibration and pitch. Generally, a shock mount with a range of motion of 1-centimeter is sufficient to accommodate normal vibration levels.

If exposed to pitch, the pitch angle seen by finder 10 is equal to the sum of the pitch of the object on which it is mounted as well as its own pitch. Accordingly, performance quality can be better maintained by constraining the motion of shock mount 18 to be strictly perpendicular to the mounting point. That constraint makes the pitch angle seen by the finder to be the same as the pitch angle of the object to which it is mounted.

Finder 10 may also include electronic stabilization components. Additionally, the finder may be connected to a standard television monitor 20 for video depiction of the field of view.

Figure 2:
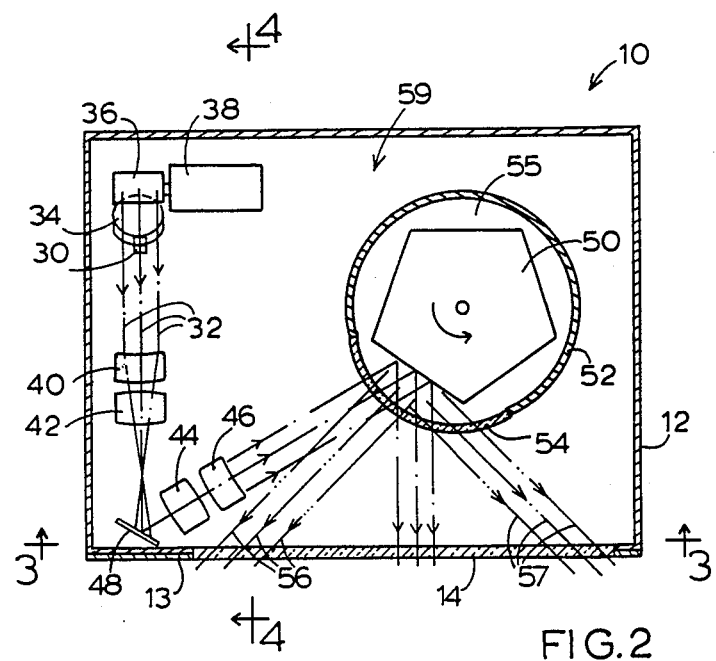
FIG. 2 is a top, internal view of the imaging range finder taken along line 2—2 in FIG. 1.

FIG. 2 shows a top, internal view of finder 10 taken along line 2—2 in FIG. 1. This view illustrates certain elements used in the finder.

Specifically, a radiation transmitter 30 produces radiation 32. In FIG. 2, the view of transmitter 30 is partially obstructed. In the preferred embodiment, transmitter 30 is a one watt continuous-wave laser diode operating at a wavelength of about 810-nanometers with a size of 1×200-micrometers and angular radiation projection of 40-degrees vertical by 10-degrees horizontal. Accordingly, in the preferred embodiment, radiation 32 is laser light. One possible laser diode is Spectra Diode Labs Model SDL-2460-H1.

Radiation 32 is next collimated by collimating lens 34. In the preferred embodiment, the laser light is collimated into a laser beam having a 7-milliradian divergence in object space. In FIG. 2, the view of lens 34 is partially obstructed.

The laser diode of the preferred embodiment emits laser light with different properties in the horizontal and vertical axes. Specifically, in the horizontal dimension the laser diode radiates into a 10-degree cone, while in the vertical dimension the laser diode radiates a 40-degree cone To accomplish a divergence of 7-milliradians in the horizontal axis, a lens of focal length 28.6-millimeters may be placed at 28.6-millimeters from the laser diode. To accomplish a divergence of 7-milliradians in the vertical axis, a lens of focal length 28.3-millimeters may be placed at 28.6-millimeters from the laser diode. In the preferred embodiment, these lenses are combined so that collimating lens 34 is an anamorphic lens.

Alternatively, the 7-milliradian divergence in the vertical axis may be obtained by using two lenses, the first lens being cylindrical so that it has zero power in the horizontal axis, with a focal length of 26.5-millimeters and located at 20.8-millimeters from the laser diode. The second lens can be combined with the horizontal axis lens in an anamorphic unit.

After being collimated, radiation 32 is reflected from a first dither mirror 36. Mirror 36 rocks back and forth around its center longitudinal axis and is driven by a stepping motor or galvanometer drive 38. Rocking of mirror 36 causes radiation 32 to be swept through a vertical angle corresponding to the predetermined vertical angular field of view.

After being reflected from mirror 36, radiation 32 is directed by transmitting-pupil-relay lenses 40, 42, 44 and 46 as well as first fold mirror 48. Lenses 40-46 direct and relay the radiation image reflected from mirror 36 onto a first rotating mirror 50. The pupil relay is 1:1. Fold mirror 48 simply changes the path of radiation 32.

In the preferred embodiment, mirror 50 is a polygon mirror. The polygon mirror is capable of scanning a 90-degree horizontal angular field of view.

Mirror 50 is enclosed within first vacuum cavity housing 52. Housing 52 includes a first optically neutral aperture 54 and defines first vacuum cavity 55. Cavity 55 aids mirror 50 to spin at high speeds.

Lenses 40-46 and mirror 48 direct radiation through aperture 54 and onto mirror 50. Mirror 50 directs radiation back through aperture 54 and then through window 14, and scans it across a predetermined angular field of view. First ray bundle 56 shows radiation 32 being reflected at one extreme of the field of view and second ray bundle 57 shows radiation 32 being reflected at the opposite extreme.

Collimating lens 34, mirror 36, lenses 40-46, mirror 48, and mirror 50 all form an optical train or path. After following the optical path, i.e. traveling downstream, radiation 32 scans across the predetermined angular field of view. When radiation 32 strikes an object in the field of view, some radiation is reflected. Finder 10 collects the reflected radiation, and thereby gathers the information necessary to image and range find objects.

Since the reflected radiation may be many orders of magnitude weaker than outgoing radiation 32, it is essential that there be no scattering of radiation within the finder. Therefore, finder 10 requires two separate sections. The previously discussed optical elements comprise the transmitting section 59 and are located behind window 14.

Figure 3:
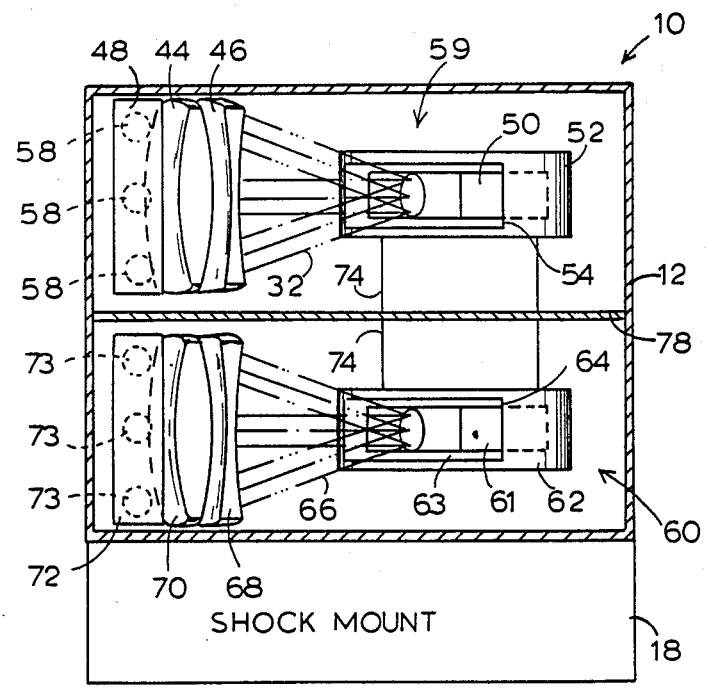
FIG. 3 is an front, internal view of the imaging range finder taken along line 3—3 in FIG. 2.

The second section is the receiving section 60 shown in FIG. 3. It is located in casing 12 behind window 16. The optics of receiving section 60 present more constraints than the optics of transmitting section 59 because section 60 deals with larger ray bundles.

Considerable space may be saved by making transmitting section 59 smaller than receiving section 60. This is possible because radiation 32 is comprised of smaller ray bundles than any reflected radiation. However, in the preferred embodiment transmitting section 59 duplicates receiving section 60 to simplify design and assembly. Thus, receiving section 60 employs the same optical train as used in transmitting section 59, the only difference being that reflected radiation travels in the opposite direction, i.e., into finder 10.

FIG. 3 shows an internal, front view of finder 10 taken along line 3—3 in FIG. 2. Casing 12 is shown housing the different elements. Shock mount 18 is also shown connected to casing 12.

FIG. 3 also shows mirror 48 and lenses 44 and 46. Image circles 58 depict the radiation image reflected from mirror 36 at three different positions as it scans radiation 32 through the vertical field of view. Mirror 50 is shown enclosed in housing 52. Radiation 32 is depicted as passing through aperture 54 and striking mirror 50.

The front view of the elements comprising receiving section 60 are also shown. A second rotating mirror 61 is revealed enclosed in a second vacuum cavity housing 62.

In the preferred embodiment, mirror 61 is a polygon mirror having a radius of 2.4-inches. It is of sufficient height to collect radiation over a 1-inch pupil. With those dimensions, mirror 61 results in a 63% scan efficiency given a 1-inch pupil and a 15-degree internal clearance angle. Mirror 50 duplicates mirror 61.

Housing 62 defines a second vacuum cavity 63, and has a second optically neutral aperture 64. Reflected radiation is shown at 66. Receiving-pupil-relay lenses 68 and 70, and a second fold mirror 72 are also shown. Reflection circles 73 depict the reflected radiation image reflected from mirror 61 at different positions in the vertical scan.

Reflected radiation 66 enters finder 10 through window 16. Reflected radiation 66 then passes through aperture 64 and strikes mirror 61. Mirror 61 directs reflected radiation 66 through lenses 68 and 70. Mirror 72 then changes the direction of reflected radiation.

FIG. 3 also shows motor housing 74. Housing 74 encloses a standard motor. Mirrors 50, 61 are both driven by the motor enclosed in housing 74. Using a single motor to drive both rotating mirrors allows these mirrors to scan the field of view simultaneously.

In the preferred embodiment, to achieve video depiction of the field of view, finder 10 raster scans 128-lines-per-frame, each line having 256-pixels. This corresponds to a 30-hertz horizontal sweep frequency.

Horizontal sweep is accomplished by spinning rotating mirrors 50, 61 at approximately 46,000-revolutions-per-minute. This results in a scan-dwell time of approximately 0.64-microseconds per pixel at 63% scan efficiency.

Additionally, the preferred embodiment is designed to operate over a maximum range of 100-meters. The round-trip time for radiation 32 to travel 100-meters away from the finder, and then to be reflected back, is approximately $\frac{2}{3}$-microseconds. At a scan rate of 30-hertz and a scan efficiency of 63%, the round-trip time is essentially equal to the scan-dwell time of one pixel. This constitutes a natural limit on the angular resolution for a 1-100-meter range system.

Rotating mirrors 50, 61 may be offset to compensate for the time required for radiation 32 to be emitted and reflected. Offsetting mirrors 50, 61 to eliminate this effect at 50-meters will result in the mirrors being only $\frac{1}{2}$-pixel off at 100-meters. Longer ranges or faster scan rates would cause shifts larger than a pixel, thus significantly degrading image quality.

FIG. 3 clearly shows that finder 10 is divided into transmitting section 59 and receiving section 60 by partition 78. Partition 78 insures that there is no scattering of radiation within the system between the transmitting and receiving sections.

Figure 4:
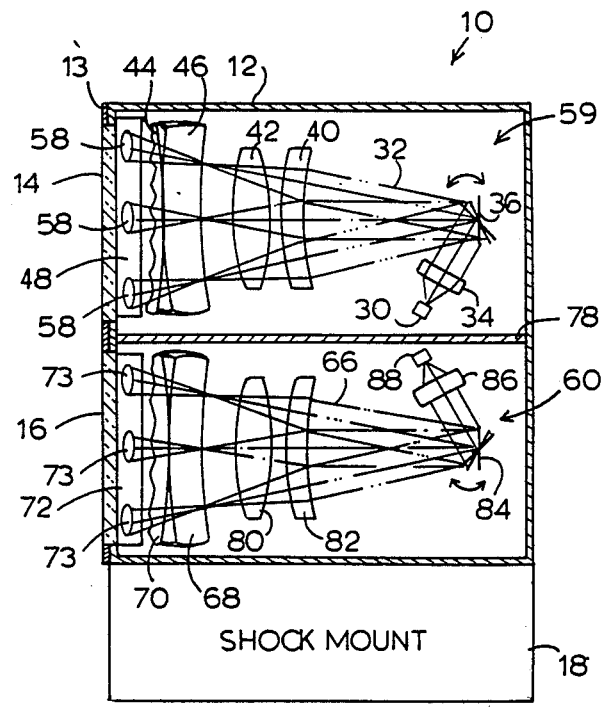
FIG. 4 is an internal, side view taken along line 4—4 in FIG. 2.

FIG. 4 shows an internal, side view of finder 10 taken along line 4—4 in FIG. 2. Lens 44 and lens 70 are cut away to show mirrors 48, 72. Galvanometer drive 38 is not shown.

Additional receiving-pupil-relay lenses 80 and 82 are depicted. Together, lenses 68, 70, 80 and 82, and mirror 72, direct and relay the image reflected from mirror 61 to second dither mirror 84. Lenses 68, 70, 80, 82 are approximately 5-inches tall and typically about 0.8-inches thick in order to operate over a 40-degree vertical field of view and form a 1-inch pupil. That pupil's relay is 1:1.

Mirror 84 rocks as does mirror 36. Mirror 84 is driven by a second stepping motor or galvanometer drive (not shown). Rocking of mirror 84 scans the vertical angular field of view to receive reflected radiation 66.

Reflected radiation 66 reflects from mirror 84 and strikes collecting lens 86. In the preferred embodiment, lens 86 is an f/1 aspheric collecting lens which focuses reflected radiation 66 from an object space subtense of 20-milliradians.

Reflected radiation 66 is focused on detector 88. In the preferred embodiment, detector 88 is an avalanche photodiode with approximately a 20-mils active diameter. The projected active diameter of detector 88 is larger than the 7-milliradians of divergence in object space of radiation 32 in order to facilitate alignment. One possible detector is a Texas Optoelectronics type TIED88 silicon avalanche photodiode.

A second embodiment of the invention may use multiple detectors and/or multiple lasers. Multiple detectors may be arranged in a staggered vertical column so that there is no dead space between them. Each detector would detect one line per facet of mirror 61. Such a configuration would reduce the speed at which rotating mirrors 50, 61 spin. Accordingly, each pixel would have a longer dwell time, resulting in a better signal-to-noise ratio and a reduction in the time-of-flight limitations on angular resolution.

Additionally, since each detector must view a laser-illuminated region in object space, the illumination must be enlarged. This may be accompanied by a proportionate increase in the total laser power to maintain the same signal strength per detector.

Figure 5:
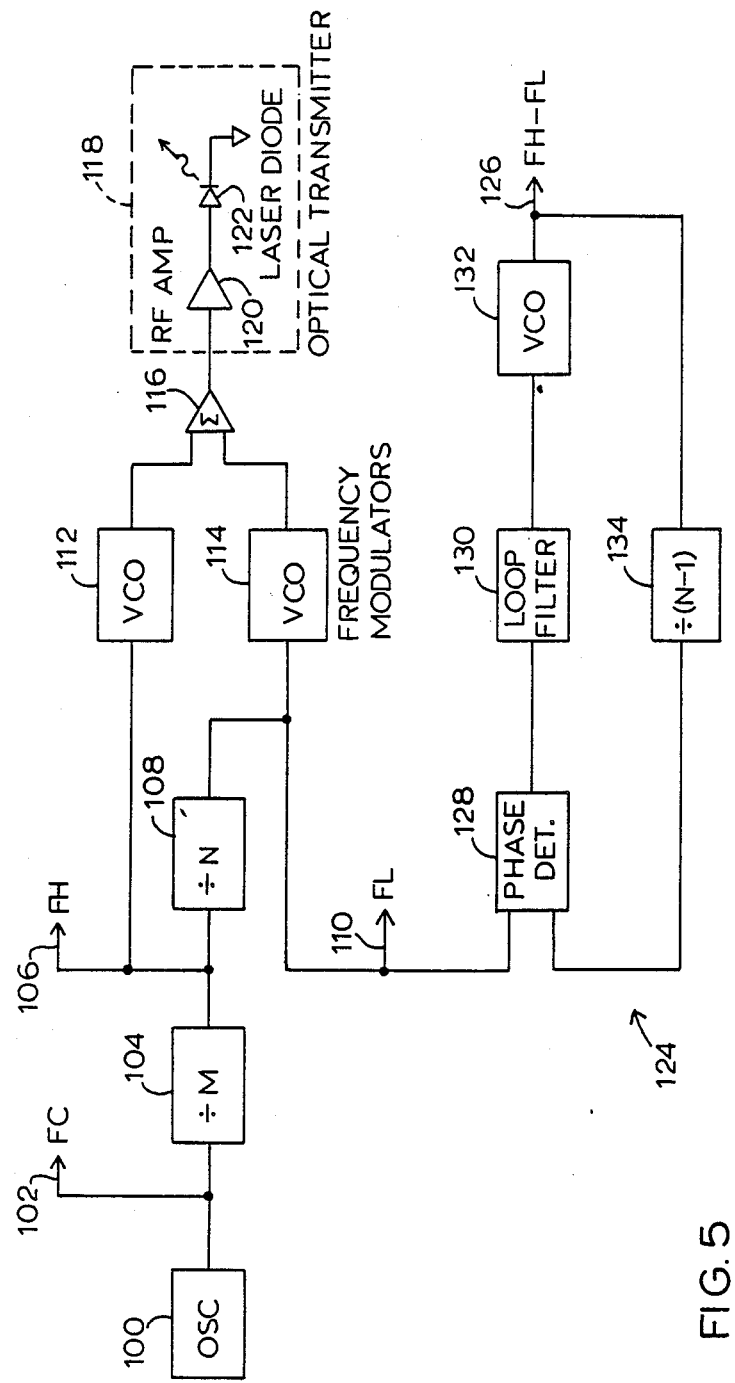
FIG. 5 is a block diagram of the radiation modulation.

FIG. 5 shows a block diagram of the radiation modulation. Again, in the preferred embodiment, the radiation source is a diode laser. Diode lasers are amenable to high frequency amplitude modulation by one or more subcarriers. However, the phase encoding and its extraction is optimally performed using frequency modulation. Accordingly, the radiation modulator shown in FIG. 5 performs frequency modulation on amplitude modulated subcarriers.

Referring specifically to FIG. 5, the radiation modulation circuitry includes a high frequency oscillator 100 which generates a fundamental clock frequency (FC) 102. A divide-by-M counter 104 generates the high modulation frequency (FH) 106. A divide-by-N counter 108 generates the low modulation frequency (FL) 110 from FH.

A first FM modulator 112 is used for FH. A second FM modulator 114 is used for FL. Each modulator is a voltage controlled oscillator (VCO) with respective subcarrier frequencies of 6-megahertz (for FL) and 32-megahertz (for FH), assuming a 30-hertz frame rate.

The modulated FH and FL signals are added in first summer 116. The signal is then conveyed to optical transmitter 118 comprising radio frequency amplifier 120 and laser diode 122.

FL signal 110 is also multiplied by (N-1) phase lock loop circuit 124 to generate the frequency FH-FL designated at 126. Phase lock loop circuit 124 includes phase detector 128, loop filter 130, voltage controlled oscillator 132 and divide-by-(N-1) counter 134.

Figure 6:
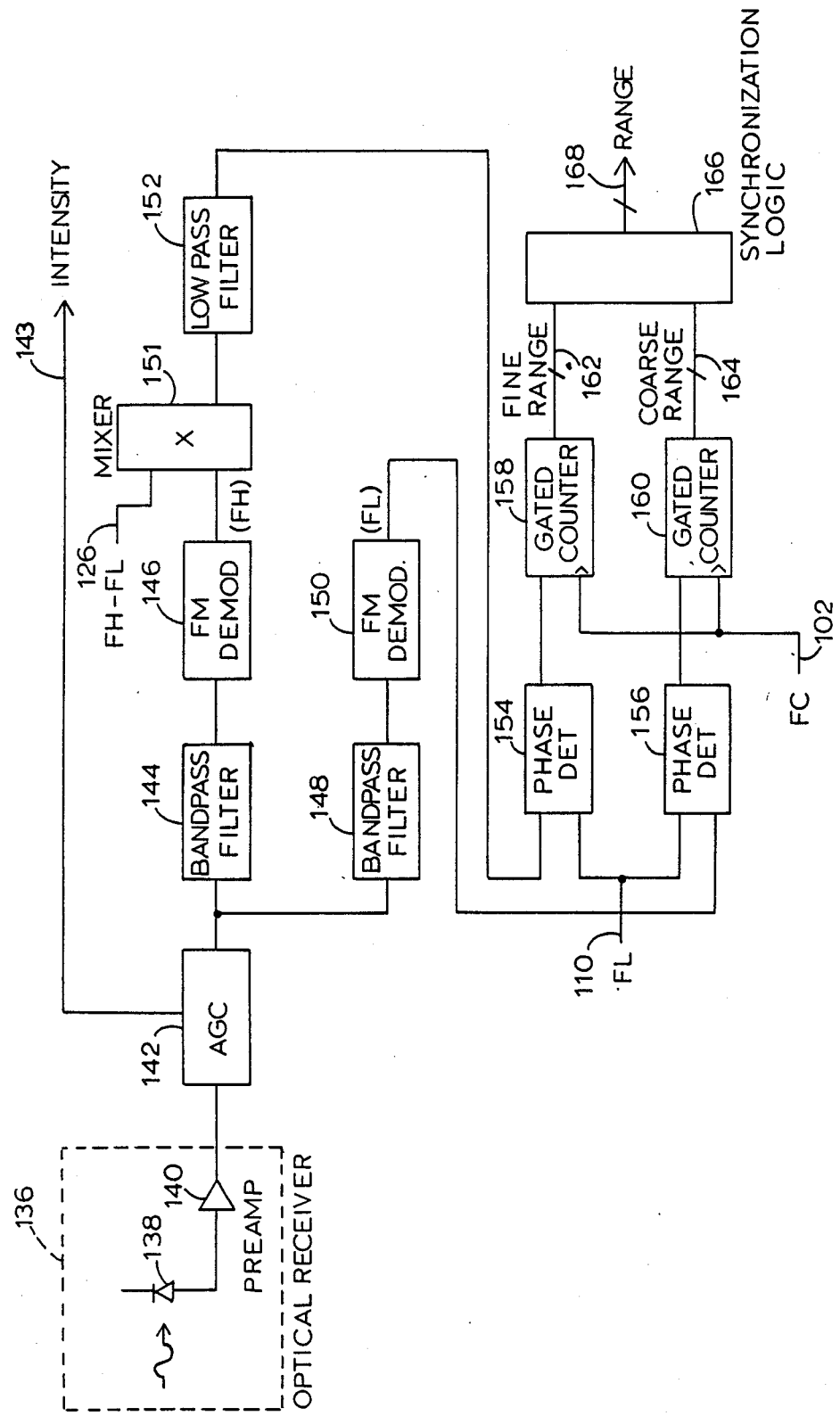
FIG. 6 is a block diagram of the radiation receiver and signal processor.

FIG. 6 is a block diagram of the reflected radiation receiver and signal processor. Optical receiver 136 includes a low-noise, wide bandwidth photo detector 138 and amplifier 140. Amplifier 140 converts the photocurrent from photo detector 138 to output voltage.

The received signal is then directed to an automatic gain control device (AGC) 142. Device 142 measures intensity and outputs intensity signal 143. Automatic gain control device 142 also directs the received signal to signal demodulators. First bandpass filter 144 separates out the FH signal and first FM demodulator 146 demodulates the FH signal. Second bandpass filter 148 separates out the FL signal and second FM demodulator 150 demodulates the FL signal.

Mixer 151 is used to multiply the demodulated FH signal by the FH-FL signal 126 to achieve a time division effect. That results in a signal of frequency FL that carries the phase shift information, which is the transit time delay on the FH signal. This preservation of phase while downshifting frequency allows high resolution of the FH channel The mixed signal then passes through low pass filter 152 in order to improve the signal-to-noise ratio. The bandwidth of low pass filter 152 should be the same as the demodulated bandwidth of FL signal 110 so that dynamic performance is not adversely affected.

Digital phase detectors 154, 156 compare the phase of the reference FL signal 110 and the two demodulated signals. The phase detectors measure the time between a zero crossing on a reference signal to the zero crossing on the demodulated signal. Either a 360-degree phase detector which makes one measurement each FL cycle or a 180-degree phase detector which makes two measurements each cycle may be used. The use of a 180-degree phase detector results in a lower FL frequency and has potential advantages in implementation and signal-to-noise ratio.

The outputs from phase detectors 154, 156 are directed to gated counters 158, 160 and comprise a fine range output 162 and a coarse range output 164.

These outputs are compared by coarse-fine synchronization logic 166. At short ranges, this logic function compares the two overlapping bits of the coarse and fine range outputs. Then, depending on the state of these bits, it either adds one to the coarse output, subtracts one, or leaves it alone, as required to cause the two least significant coarse bits to equal the two most significant fine bits. At longer ranges, where the FH channel may drop below FM detection threshold, the FH channel output is disabled. The most significant bit is set to one and the lower bits are set to zero. The result is a single, unambiguous range output 168 which exhibits fine resolution at close range where it is meaningful and a stable coarse range output at longer ranges In counters 104 and 108 respectively (shown in FIG. 5), M and N should be binary multiples in order to simplify the design of the coarse-fine synchronization logic 166. Additionally, M must be greater than or equal to 4 with a 360-degree phase detector or greater than or equal to 8 with a 180-degree phase detector in order to have at least two bits of overlap between coarse and fine outputs for synchronization. Additionally, FC signal 102 should not be higher in frequency that 250-megahertz so that implementation with standard emitter-coupled logic is possible.

The above-described manner of transmitting, receiving and analyzing radiation may be referred to as direct detection. This is in contrast to heterodyne detection which compares reflected radiation with a locally generated reference wave.

Figure 7:
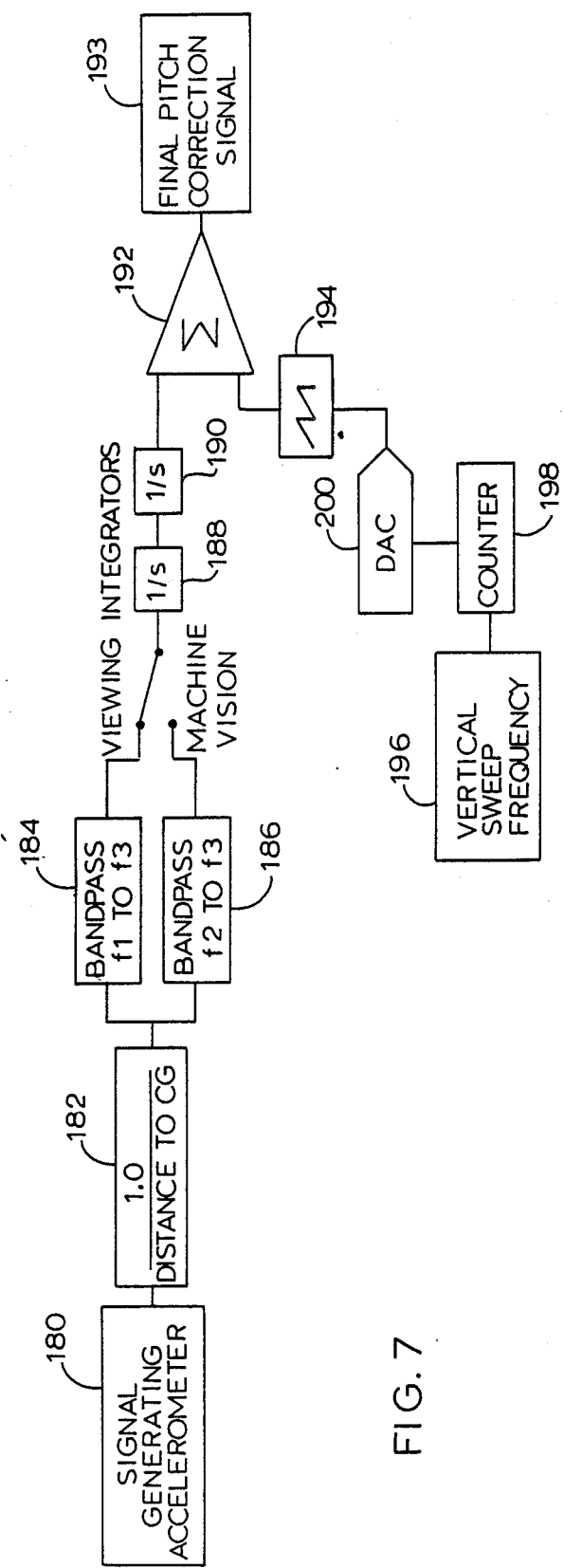
FIG. 7 is a block diagram of a vibration and pitch stabilizer.

FIG. 7 is a block diagram of the electronics used in the vibration and pitch stabilizer. As previously stated, the preferred embodiment may include both mechanical shock mount 18 and certain electronic pitch correction.

In order to implement electronic pitch correction, an accurate instantaneous pitch signal must be obtained. An angular acceleration signal is a sufficient instantaneous pitch signal. In the preferred embodiment, the instantaneous pitch signal is produced by an accelerometer 180.

Generally, for finder 10 to be subject to pitch, it would be mounted on a vehicle. In such a case, accelerometer 180 may be mounted near the front of the vehicle. If the motion near the center of the vehicle is small compared to the motion near the front, the pitch angular acceleration can be accurately approximated as the output from accelerometer 180 divided by the longitudinal distance between the accelerometer mount and the center of gravity of the vehicle. This is illustrated as divider 182. The signal is then filtered by third bandpass filter 184 or fourth bandpass filter 186, depending on whether the output is intended for viewing by human observers or machine vision.

Filter 184 filters over predetermined frequencies f1 to f3. Frequency f1 is approximately 1- to 2-hertz. Display motion above this frequency is uncomfortable or fatiguing for human viewing.

Frequency f2 is equal to the frame rate selected for finder 10 divided by 2. The field of view would be sampled at the frame rate. According to the Nyquist sampling theorem, useful information can only be recovered below f2. Motion above f2 will cause aliasing, exhibited as discontinuities in the display which cover up or destroy useful information. Frequency f3 is the maximum frequency for which electronic pitch correction of the vertical scan will eliminate aliasing.

Accordingly, frequencies below f1 contain useful information and no filtering is necessary or desirable. Frequencies between f1 and f2 contain information which may be useful for machine vision, but filtering is necessary for human viewing. Frequencies between f2 and f3 cause undesirable aliasing affects and electronic filtering or correction may be applied. Frequencies above f3 cause aliasing and only mechanical vibration isolation is effective in counteracting vibration in this region.

In the case of human observation, the signal content between f1 and f3 is directed to signal integrators 188, 190. The output of these integrators is the desired pitch correction signal, and is combined by second summer 192 with the sawtooth signal 194 that drives first and second dither mirrors 36, 84 and outputs final pitch correction signal 193.

Sawtooth signal 194 is produced by inputting vertical sweep frequency 196 into counter 198 and then to digital-to-analogue converter 200. In the preferred embodiment vertical sweep frequency is 30-hertz.

Figure 8:
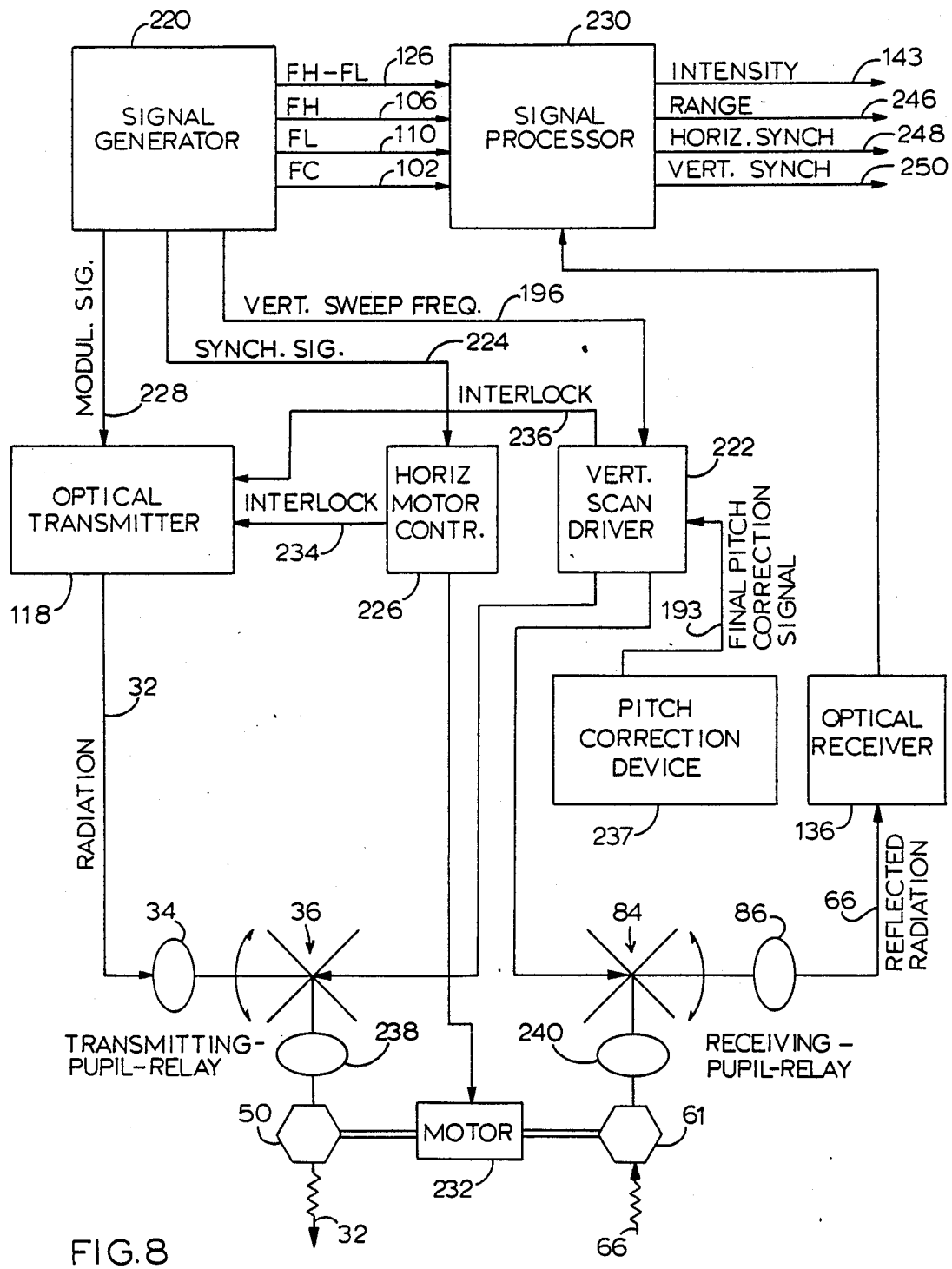
FIG. 8 is a block diagram of an imaging range finder constructed according to the invention.

FIG. 8 is a block diagram of finder 10 showing the relation between the electronics and optics. Signal generator 220 includes the radiation modulation disclosed in FIG. 5. Signal generator 220 also directs and supplies the reference vertical sweep frequency 196 to vertical scan driver 222, a synchronization signal 224 to horizontal motor control 226, and modulated signal 228 to optical transmitter 118. Additionally, signal generator 220 sends FH-FL signal 126, FH signal 106, FL signal 110 and FC signal 102 to signal processor 230.

Optical transmitter 118 was previously discussed in relation to FIG. 5. Horizontal motor control 226 controls motor 232 which drives rotating mirrors 50, 61.

Vertical scan driver 222 includes the galvanometer drives which move dither mirrors 36, 84. Additionally, motor control 226 and driver 222 control the actuation of optical transmitter 118 through interlocks 234, 236. These interlocks operate as a fail safe mechanism to limit laser output in the event motor control 226 and driver 222 stop functioning.

Driver 222 also receives final pitch correction signal 193 from pitch correction device 237. Device 237 includes those elements discussed in relation to FIG. 7.

Radiation 32 from optical transmitter 118 is directed toward collimating lens 34, first dither mirror 36, transmitting-pupil-relay 238, first rotating mirror 50 and is thereafter scanned across the field of view. Transmitting-pupil-relay 238 includes lenses 40-46 and mirror 48.

Reflected radiation 66 is collected by second rotating mirror 61, directed toward receiving-pupil-relay 240, second dither mirror 84, collecting lens 86, and optical receiver 136. Receiving-pupil-relay 240 includes lenses 68, 70, 80, 82, and mirror 72.

The detected signal is then processed in signal processor 230. Processor 230 includes the signal processing elements discussed in relation to FIG. 6. Processer 230 produces the final intensity signal 143, range measurement 246, horizontal synchronization signal 248 and vertical synchronization signal 250.

These final signals may be directed to television monitor 20, a printer, computer or other device.

Application

Imaging range finder 10 is a three-dimensional sensor that achieves 50-microsteradian resolution over a 90-degree horizontal by a 40-degree vertical field of view at video frame rates. Terrestrial features are measured at distances from one to approximately 100-meters. More precise range measurements are made at up to approximately 36-meters. Resolution and accuracies of less than 10-centimeters are obtained. The device functions at day or night and detects all solid, semi-solid and liquid matter.

Finder 10 may be used as a three-dimensional robotic vision device for autonomous land vehicles. Additionally, the finder may be used in industrial and computer-aided design (CAD) applications.

For CAD applications, finder 10 can be modified to determine range more precisely by functioning only over short distances. The shorter range gives reflected radiation 66 more intensity which in turn allows better range resolution, better lateral resolution, and raster-scan rates greater than 30-hertz.

Finder 10 may function at the NTSC standard picture frame frequency of approximately 30-hertz or at the CCIR standard frequency of approximately 25-hertz. The preferred embodiment of finder 10 range finds using two amplitude modulated subcarriers, however, one subcarrier may be used.

While a preferred embodiment of the invention has been disclosed, it should be understood that certain variations and modifications may be made thereto without departing from the spirit of the invention.

It is claimed and desired to secure by Letters Patent:

1. A device for imaging and range finding objects within a predetermined angular field of view comprising:
   imaging means having an angular field of view greater than 45-degrees horizontal and 30-degrees vertical for video depiction of such an object; and
   range finding means operably coupled to said imaging means for determining, throughout the entirety of such field of view, the distance between the device and the object while simultaneously imaging.

2. A device for imaging and range finding objects within a predetermined angular field of view, with both imaging and range finding occurring at standard picture frame frequency, said device comprising:
   imaging means for video depiction of such an object; and
   range finding means operably coupled to said imaging means for determining the distance between the device and the object.

3. A device for imaging and range finding objects within a predetermined angular field of view, with both imaging and range finding occurring at standard picture frame frequency, said device comprising:
   imaging means having an angular field of view greater than 45-degrees horizontal and 30-degrees vertical for video depiction of such an object; and
   range finding means operably coupled to said imaging means for determining, throughout the entirety of such field of view, the distance between the device and the object.

4. A device for imaging and range finding objects within a predetermined angular field of view, with both imaging and range finding occurring at standard picture frame frequency, said device comprising:
   imaging means having an angular field of view greater than 45-degrees horizontal and 30-degrees vertical for video depiction of such an object;
   range finding means operatively coupled to said imaging means for determining, throughout the entirety of such field of view, the distance between the device and the object; and
   stabilization means operatively connected to said imaging means and to said range finding means for preserving the device's imaging and range finding accuracy when the device is exposed to vibration and pitch.

5. The device of any one of claims 1-4 in which said imaging means comprises:
   a radiation transmitter controlled to produce radiation;
   scanning means positioned adjacent said transmitter for directing such radiation across the predetermined angular field of view, said scanning means including an optical train having upstream and downstream ends with the downstream end defined by a first rotating mirror having a plurality of facets, rotation of such mirror directing radiation across the predetermined angular field of view.

6. The device of claim 5 in which said imaging means further comprises:
   receiving means for collecting the radiation reflected from such object including a second rotating mirror having a plurality of facets rotatably mounted to the receiving means, where the rotation of the second rotating mirror collects reflected radiation from across the entire angular field of view, and where the second rotating mirror is the first optical element of the device affecting the reflected radiation.

7. A device for imaging and range finding objects within a predetermined angular field of view comprising:

a radiation transmitter controlled to produce radiation;

radiation modulation means for producing at least two subcarriers in the radiation;

scanning means positioned adjacent said transmitter for sweeping such radiation throughout such predetermined field of view; and range finding means responsive to reflection-returned data contained in such at least two subcarriers to generate differentiated range information—long-range information being derived from data contained in one of the reflected subcarriers, and short-range information being derived from data contained in the other reflected subcarrier.

8. The device of claim 7 in which said range finding means further includes subcarrier signal integration means for combining the information from the subcarriers to produce a single range measurement and for automatically determining range more precisely at shorter ranges.

9. The device of claims 7 or 8 in which said scanning means includes an optical train having upstream and downstream ends with the downstream end defined by a rotatable mirror having a plurality of facets.

10. The device of claims 7 or 8 further comprising a receiving means for collecting radiation reflected from such object including a second rotating mirror having a plurality of facets rotatably mounted to the receiving means, where rotation of the second rotating mirror collects reflected radiation from across the entire angular field of view, and where the second rotating mirror is the first optical element of the device affecting the reflected radiation.

11. A device for imaging and range finding objects within a predetermined angular field of view, comprising:

imaging means for video depiction of such an object at standard picture frame frequency including;

a radiation transmitter controlled to produce radiation; and scanning means positioned adjacent said transmitter for sweeping such radiation throughout such angular field of view;

range finding means operably coupled to said imaging means for determining the distance between the device and the object, including;

radiation modulation means for producing one or more subcarriers, each subcarrier being used to ascertain information from which the distance between the device and such an object may be determined; and subcarrier signal integration means for processing the information from each subcarrier to produce a single range measurement; and stabilization means operatively connected to said imaging means and said range finding means for preserving the device's imaging and range finding accuracy when the device is exposed to vibration.

12. The device of any one of claims 1-4 or 11 wherein:

said imaging means includes a television monitor having a television display comprised of pixels; and said range finding means determines the distance between the device and objects on a pixel-by-pixel basis.

13. A method for imaging and range finding objects within a predetermined angular field of view comprising:

transmitting radiation;

scanning such radiation across an angular field of view greater than 45-degrees horizontal and 30-degrees vertical by employing a rotating, multi-faceted mirror to direct such radiation across at least one dimension of the angular field of view, receiving radiation reflected from objects within such angular field of view, processing the reflected radiation to derive image and distance information from such objects, and displaying such derived image information in video format at standard picture frame frequency.

14. A device for imaging and range finding objects within a predetermined angular field of view comprising:

imaging means having an angular field of view greater than 45-degrees horizontal and 30-degrees vertical for video depiction of such an object; and range finding means operatively coupled to said imaging means for determining the distance between the device and the object by direct, non-heterodyne detection.

* * * * *